US008295003B2

(12) United States Patent
Chou et al.

(10) Patent No.: US 8,295,003 B2
(45) Date of Patent: Oct. 23, 2012

(54) THERMAL ASSISTED HEAD USING CURVED WAVE GUIDE

(75) Inventors: Tsutomu Chou, Tokyo (JP); Seiichi Takayama, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 170 days.

(21) Appl. No.: 12/786,915

(22) Filed: May 25, 2010

(65) Prior Publication Data

US 2011/0292772 A1   Dec. 1, 2011

(51) Int. Cl.
  *G11B 5/02*   (2006.01)
  *G02B 6/26*   (2006.01)
  *G02B 6/42*   (2006.01)
  *G02B 6/10*   (2006.01)

(52) U.S. Cl. .............................. 360/59; 385/32; 385/130

(58) Field of Classification Search ........................ None
See application file for complete search history.

(56) References Cited

U.S. PATENT DOCUMENTS

| 6,026,209 | A  | 2/2000 | Rhee et al. |
| 7,221,826 | B2 | 5/2007 | Hanashima et al. |
| 7,330,404 | B2 | 2/2008 | Peng et al. |
| 7,643,248 | B2 | 1/2010 | Sluzewski |
| 2008/0107377 | A1 | 5/2008 | Cho et al. |
| 2011/0122737 | A1* | 5/2011 | Shimazawa et al. ........ 369/13.24 |
| 2011/0222190 | A1* | 9/2011 | Hara et al. ................. 360/234.6 |

FOREIGN PATENT DOCUMENTS

JP   A-H11-167032   6/1999
JP   A-2005-70469   3/2005

OTHER PUBLICATIONS

*Intel Technology Journal*, Silicon Photonics, May 10, 2004, vol. 08, Issue 02, ISSN1535-864X, pp. 153-156.

* cited by examiner

*Primary Examiner* — Regina N Holder
(74) *Attorney, Agent, or Firm* — Posz Law Group, PLC

(57) ABSTRACT

A curved waveguide is a curved waveguide that propagates laser light entering from the laser diode as propagating light. The curved waveguide includes a core that is curved in one direction where the propagating light can be propagated and that includes outer surfaces along a propagating direction of the propagating light defined by four surfaces including first and second planar surfaces that curve in respective planar surfaces and that are positioned to face each other, and inside and outside curved surfaces that connect the first and second planar surfaces: an outside metal cladding that is positioned in a direction orthogonal to an oscillation direction of an electric field of the propagating light in a cross section orthogonal to the propagating direction of the propagating light and along the outside curved surface of the core, that is made of gold, silver, copper or aluminum, or that is primarily composed of one component of these materials; and a cladding layer that covers the first and second planar surfaces and the outside metal clad.

15 Claims, 10 Drawing Sheets

Fig.1A　　　　　　　　　　　　　　　　　　　　PRIOR ART
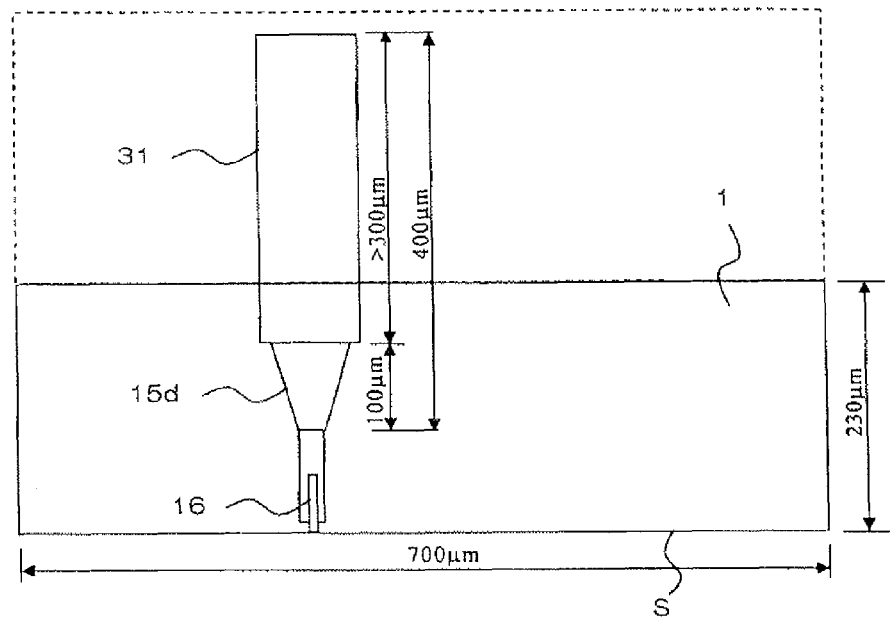
Fig.1B
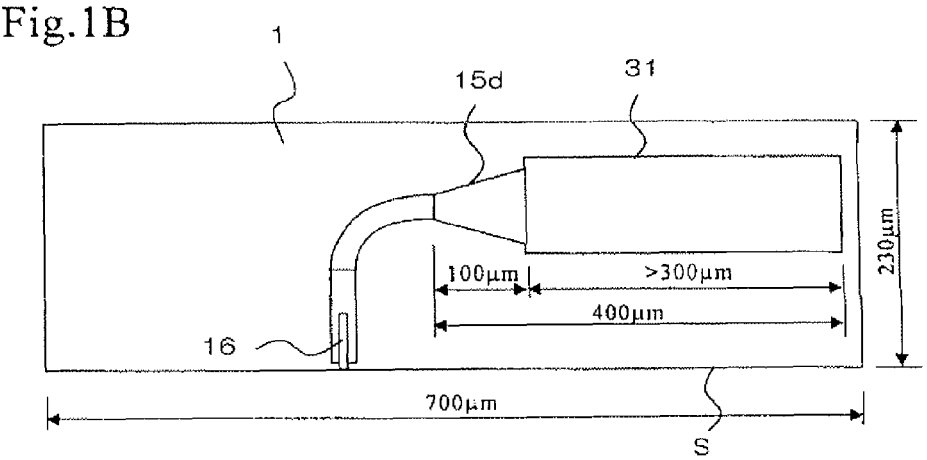

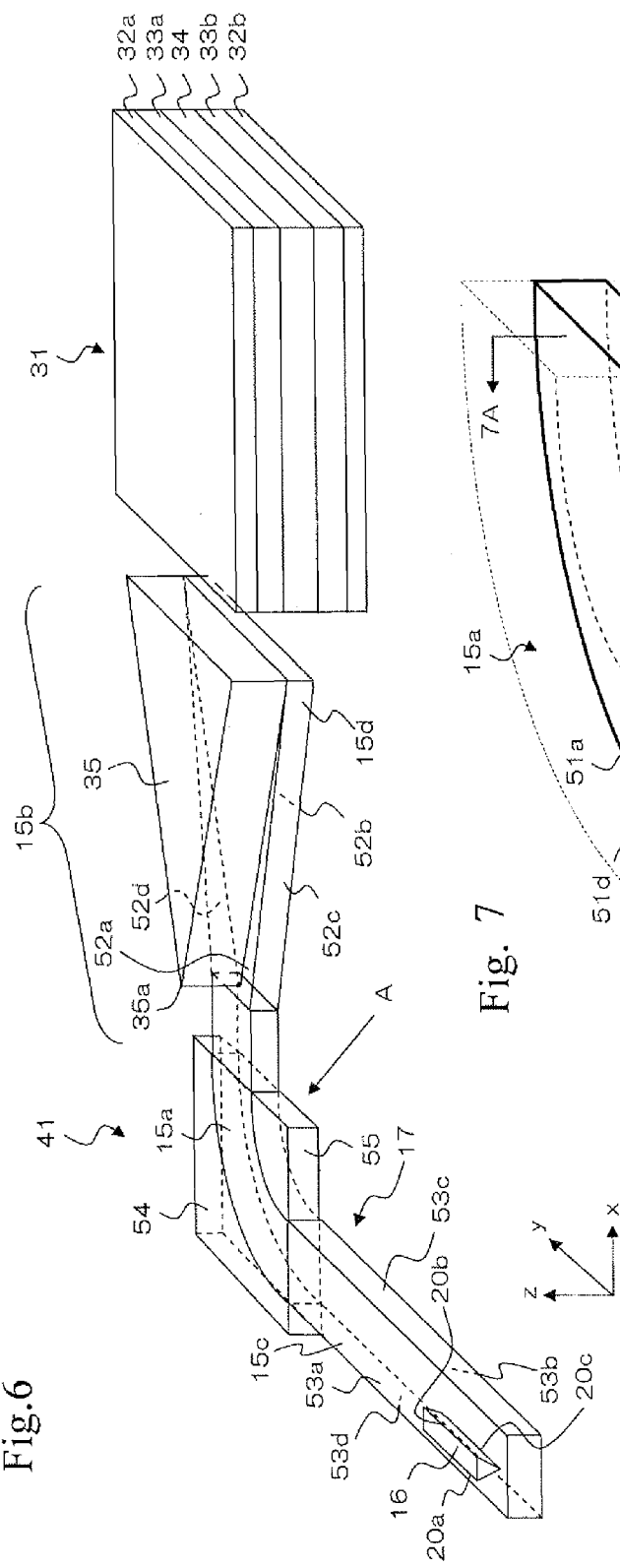
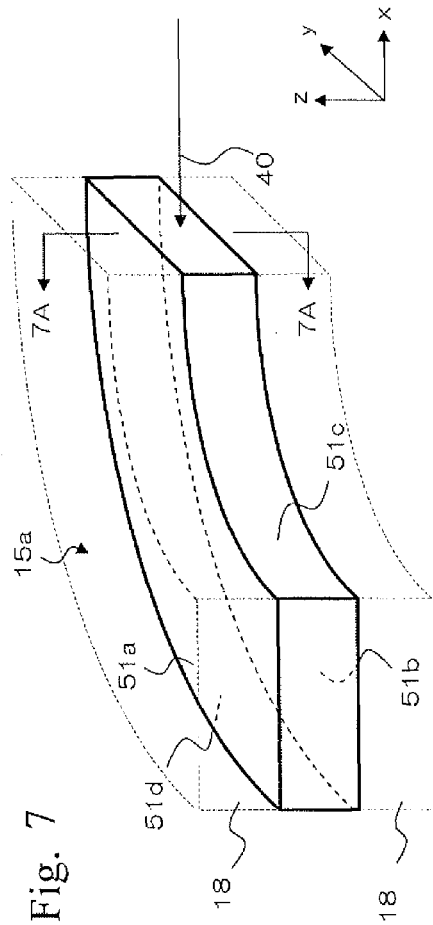
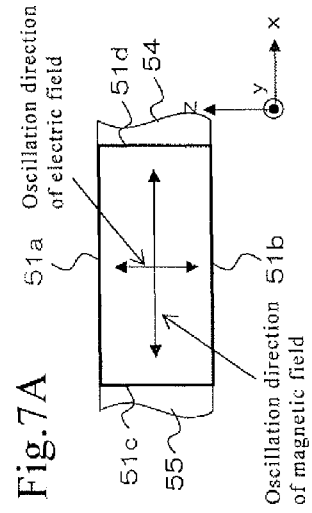

THERMAL ASSISTED HEAD USING CURVED WAVE GUIDE

BACKGROUND OF THE INVENTION

1. Field of the Invention

The present invention relates to a waveguide and a thermally assisted type magnetic head using this waveguide.

2. Description of the Related Art

Recently, in magnetic recording devices, such as hard disk devices, performance improvement of a thin film magnetic head and a magnetic recording medium is in demand in association with high recording density. As the thin film magnetic head, a combination type thin film magnetic head is widely used, where a reproducing head having a magneto resistive effect element (hereafter, also referred to as MR element) for reading, and a recording head having an inductive transducer (magnetic recording element) for writing are laminated onto a substrate. In a hard disk device, the thin film magnetic head is disposed in a magnetic head slider that flies slightly above the surface of the magnetic recording medium.

A magnetic recording medium is a discontinuous medium where magnetic micro particles are assembled, and each magnetic micro particle has a single-domain structure. In this magnetic recording medium, one recording bit is composed of a plurality of the magnetic micro particles. In order to enhance the recording density, asperity of the boundary between adjacent recording bits has to be small, which means that the magnetic micro particles have to be small. However, if the magnetic micro particles are decreased in size, thermal stability of magnetization of the magnetic micro particles is reduced. In order to solve this problem, it is effective to increase anisotropic energy of the magnetic micro particles. However, if the anisotropic energy of the magnetic micro particles is increased, coercive force of the magnetic recording medium becomes great and it becomes difficult to record information by the existing magnetic head. Such a problem exists in conventional magnetic recording, which is a major obstacle to increasing the recording density.

As a method for solving this problem, the method of so-called thermally assisted magnetic recording is proposed. In this method, a magnetic recording medium having great coercive force is used, and when recording information, a magnetic field and heat are simultaneously applied to a part of the magnetic recording medium where information is recorded. This causes a rise in temperature in the part where the information is recorded and a reduction of the coercive force, and information is then recorded.

In the thermally assisted magnetic recording, a method using near field light is a known technique to add heat to a magnetic recording medium. Near field light is a type of so-called electromagnetic field to be formed around a substance. Normal light cannot be tapered to within a region that is smaller than the wavelength due to diffraction limitation. However, irradiation of light with the same wavelength on the microstructure causes the generation of near field light depending upon the microstructure scale, and enables light to be sharply tapered within a minimal region such as several tens of nm. As a specific method to generate the near field light, a method to generate laser light by a laser diode and to generate the near field light by a plasmon excited by the laser light is commonly known. The near field light is generated with a metal referred to as a probe, which is a so-called plasmon antenna.

In the plasmon antenna, the near field light is generated by directly irradiating light to the antenna, but in this technique, a conversion efficiency of the irradiated light to the near field light is low. A majority of the light energy irradiated to the plasmon antenna is reflected by the surface of the plasmon antenna or converted into thermal energy. Since the size of the plasmon antenna is set at or less than the wavelength of the light, the volume of the plasmon antenna is small. Thus, in the plasmon antenna, the temperature increase in association with the heat generation becomes very significant.

Such a temperature increase causes the plasmon antenna to expand in volume and to protrude from an air bearing surface, which is a surface facing the magnetic recording medium. The end part positioned on the air bearing surface of the MR element is away from the magnetic recording medium, and as a result, there is the problem that a servo signal recorded in the magnetic recording medium cannot be read at the time of recording movement.

Therefore, a technology where light is not directly irradiated to the plasmon antenna is proposed. For example, in a technology is disclosed in the specification of U.S. Pat. No. 7,330,404, propagating light that enters from the laser diode and that has propagated through a core of waveguide, such as a fiber optic element, is combined with a plasmon generator via a buffer portion in a surface plasmon polariton mode, and the surface plasmon is excited in the plasmon generator. The plasmon generator has an edge of plasmon generator that is positioned on the air bearing surface and that generates a near field light and a propagation edge facing the waveguide via the buffer portion. The light propagating through the core is totally reflected on the interface between the core and the buffer portion, on which occasion, light that penetrates toward the buffer portion, referred to as evanescent light, is generated. This evanescent light and a collective vibration of electrical charges in the plasmon generator are combined, and the surface plasmon is excited in the plasmon generator. The excited surface plasmon propagates to the edge of plasmon generator along the propagation edge and generates the near field light at the edge of plasmon generator. According to this technology, since light that propagates through the waveguide does not directly irradiate the plasmon generator, an excessive increase in temperature of the plasmon generator can be prevented.

Meanwhile, a laser diode for generating a laser light is arranged separately from a magnetic head slider. For example, in the specification of U.S. Pat. No. 7,643,248, a configuration is disclosed in which a surface emitting laser diode is disposed separately from a magnetic head slider. However, when the laser diode is independently disposed, a process to connect a magnetic head slider and the laser diode is required. In the connection process, it is required that a light outgoing part of the laser diode be connected to a core disposed in a magnetic head slider with high positioning accuracy. Since the laser diode is arranged in an exposed manner, it is also not preferable from a reliability standpoint. Therefore, a configuration to incorporate the laser diode in the magnetic head slider has been desired.

The simplest configuration where the laser diode is incorporated in the magnetic head slider is obtained when the laser diode is disposed such that an outgoing surface of the laser diode faces the air bearing surface of the magnetic head slider, such that an outgoing direction of the laser light is in a direction orthogonal to the air hearing surface. Since the laser light is transferred to the vicinity of the air bearing surface in a straight-shaped core as propagating light in this configuration, the propagating loss of the propagating light is small.

However, it is difficult to dispose the laser diode on the actual magnetic head slider in such a manner. FIG. 1A is a conceptual view of the laser diode disposed in an ordinary magnetic head slider in a direction where the outgoing direction of the laser light is orthogonal to the air bearing surface. Specifically, FIG. 1A is a cross sectional view of the magnetic head slider cut in the vicinity layer of the recording head. A plane size of a magnetic head slider 1 for a femto magnetic head slider, which is currently conventional, is approximately 230 μm (longitudinal direction size)×approximately 700 μm (transversal direction size), and a side including the air bearing surface S is defined as a longitudinal side. On the other hand, depending on an output of the laser light, the laser diode 31 should have a size whose side parallel to the outgoing direction of the laser light is a length of 300 μm or more and whose side orthogonal to the other side is a length of, for example, 120-200 μm. Moreover, a spot diameter of the laser light output from the laser diode is approximately 4 μm; on the other hand, the diameter in an adjacent part to a plasmon generator 16 should be tapered to approximately 0.5 μm. Therefore, the core should provide a cross section narrowing part 15d where a cross section gradually narrows along a propagating direction of propagating light. Since it is impossible to drastically vary the cross section of the cross section narrowing part, the cross section needs a length of approximately 100 μm in the propagating direction of the propagating light in order to taper the spot diameter from approximately 4 μm to approximately 0.5 μm.

Considering the matter described above, when the laser diode is arranged in a direction where the outgoing direction of the laser light is orthogonal to the air bearing surface, a length of at least 400 μm in a direction orthogonal to the air bearing surface is required for the laser diode 31 and the cross section narrowing part 15d. Additionally, since a space for disposing the plasmon generator 16 is also required, it is completely impossible to incorporate the laser diode with a conventional magnetic head slider. As illustrated with broken lines in the drawing, a size that is at least approximately twice that of the conventional longitudinal direction size is required.

On the other hand, as illustrated in FIG. 1B, when the laser diode 31 is arranged in a direction where the outgoing direction of the laser light is parallel to the air bearing surface, since there is a marginal space in the lateral direction of the magnetic head slider, it is possible to incorporate the laser diode with the conventional magnetic head slider. However, in such a configuration, a direction of a waveguide should be curved 90° in the middle as illustrated in the drawing. Technology that enables the waveguide to be curved in the middle is conventionally known. However, such a curvature radius is generally large, and technology that can be applied to a micro structural body, such as a magnetic head slider, with a scale of 0.1 mm or smaller is not known.

A waveguide having a curved part is disclosed in Japan Laid-Open Patent Publication No. H11-125726; however, the curvature radius of the waveguide is approximately 25 mm. A waveguide having an S-shaped curved part is disclosed in Japan Laid-Open Patent Publication No. H11-167032. The waveguide has a core that has a semicircular cross section arranged on an upper surface of a cladding part. In the vicinity of the core, a reflection groove is formed extending along a path of the core. The upper surfaces of the core and the reflection groove are opened and are not covered by the clad. Adjustment of the interval between the core and the reflection groove suppresses propagating loss and makes the curvature radius of the curved part small. However, a practical curvature radius is approximately 50 mm. A waveguide providing a curved part is disclosed in Japan Patent No. 4202212 as well. The curved part is formed by continuously connecting multiple minute curved lines having different respective curvature radii. However, the minimum curvature radius is approximately 5 mm, and the substantial curvature radius of the curved part is larger than the radius.

As described above, the curvature radius of the conventional curved waveguide is formed in the order of mm. However, when the curved part is disposed in the waveguide of the magnetic head slider incorporating the laser diode, a waveguide of the conventional art that realizes only a curvature radius on the order of mm cannot be applied as shown in FIG. 1B. When the curved waveguide is applied to the magnetic head slider, the curvature radius must be on the order of at least 10 μm. Considering that the magnetic head slider will be further miniaturized in the future, a waveguide having a curvature radius of 10 μm or less is preferably required.

An object of the present invention is to provide a waveguide that can propagate laser light from the laser diode as propagating light, that is curved in one direction, and that has a curvature radius that is substantially reduced. Further, another object of the present invention is to provide a magnetic head of a thermally assisted magnetic recording system in which such a waveguide is used.

SUMMARY OF THE INVENTION

A curved waveguide of the present invention is a curved waveguide that propagates laser light entering from the laser diode as propagating light. The curved waveguide includes a core that is curved in one direction where the propagating light can be propagated and that includes outer surfaces along a propagating direction of the propagating light defined by four surfaces including first and second planar surfaces that curve in respective planar surfaces and that are positioned to face each other, and inside and outside curved surfaces that connect the first and second planar surfaces; an outside metal cladding that is positioned in a direction orthogonal to an oscillation direction of an electric field of the propagating light in a cross section orthogonal to the propagating direction of the propagating light and along the outside curved surface of the core, that is made of gold, silver, copper or aluminum, or that is primarily composed of one component of these materials; and a cladding layer that covers the first and second planar surfaces and the outside metal clad.

When propagating light propagates in a curved core in one direction, the propagating light does not bend sharply at a curved part, and tends to travel straight out of the core. On the other hand, when the outside metal cladding is provided along the outside curved surface of the core, the propagating light remains enclosed inside the core by the outside metal clad. Although the reason has not been completely determined, it is assumed that a reflection function of the outside metal cladding prevents the propagating light from penetrating the clad.

The first and second planar surfaces are covered by the cladding layer, not by the metal clad. As a general feature of laser light (propagating light), propagating light propagates in a cladding in a state where an oscillation direction of the electric field is orthogonal to an oscillation direction of the magnetic field at a cross section orthogonal to its propagating direction. If an outside metal cladding is positioned in the oscillation direction of the electric field of the propagating light, the electric field will be absorbed or weakened by the outside metal clad, causing the propagating light to be absorbed in the curved part. In order to prevent such a phenomenon, not the metal cladding but the cladding layer having a small light absorbing function is provided in the oscillation direction of the electric field. Thereby, the propagating loss of the propagating light is controlled to be as small as possible.

A magnetic head of the present invention includes a laser diode that generates laser light; a near field generator generating near field light and including a waveguide that propagates the laser light entering from the laser diode as propagating light, and a plasmon generator that extends to an air bearing surface as facing a part of the waveguide and that generates the near field light on the air bearing surface; a main pole for recording that is disposed adjacent to the plasmon generator, and including an edge that is positioned on the air bearing surface. The waveguide includes a core through which the propagating light propagates, the core including, a curved part that is curved in one direction, a first straight part that provides a cross section narrowing part gradually narrowing in cross section along the propagating direction of the propagating light, and that includes one edge connected to the curved part and another edge connected to the laser diode, a second straight part including one edge connected to the curved part and another edge extending to the air bearing surface or to the vicinity of the air bearing surface. The core includes outer surfaces along a propagating direction of the propagating light are defined by first and second planar surfaces that curve in respective planar surfaces and that are positioned to face each other, and third and fourth surfaces that connect the first and second planar surfaces to each other, the third and fourth surfaces forming inside and outside curved surfaces in the curved part. The waveguide also includes an outside metal cladding positioned in a direction orthogonal to an oscillation direction of an electric field of the propagating light on a cross section orthogonal to the propagating direction of the propagating light and along the outside curved surface of the core, and that is made of gold, silver, copper or aluminum, or that is primarily composed of one component of these materials, and a cladding layer that covers the first and second planar surfaces and the outside metal clad. The plasmon generator extends to the air bearing surface as facing a part of the first or second planar surface of the second straight part. The plasmon generator has a propagation edge extending in a longitudinal direction. The propagation edge provides an overlapping part that overlaps the second straight part in the longitudinal direction and a plasmon generator edge part that is positioned on an air bearing surface and in the vicinity of the main pole and that generates the near field light. The overlapping part of the propagation edge generates surface plasmon by coupling the propagating light propagating in the second straight part in a surface plasmon mode, and the propagation edge propagates the surface plasmon generated in the overlapping part to the plasmon generator edge part.

As described above, the present invention provides a waveguide in which laser light can propagate from the laser diode as propagating light, that is curved in one direction, and that has a curvature radius that is substantially reduced. Further, the present invention provides a magnetic head of a thermally assisted magnetic recording system in which such a waveguide is used.

The above and other objects, features, and advantages will be disclosed referring to the attached figures illustrating the present invention.

BRIEF DESCRIPTION OF THE DRAWINGS

FIGS. 1A and 1B are views to explain the objects of the present invention.

FIG. 6 is a conceptual perspective view of a near field generator and a laser diode.

FIG. 7 is a partially enlarged perspective view of a curved part of a waveguide illustrated in FIG. 6.

FIG. 7A is a cross sectional view of an entrance part of the curved part cut along line 7A-7A of FIG. 7.

DETAILED DESCRIPTION OF THE INVENTION

Figure 2:
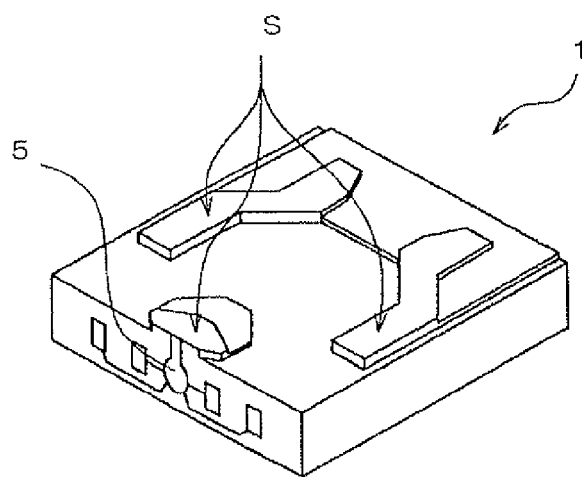
FIG. 2 is a perspective view of a magnetic head slider where a magnetic head of the present invention is incorporated.

Explanations are given regarding a magnetic head of the present invention referring to the drawings. FIG. 2 is a main part cross sectional view of a magnetic head slider including the magnetic head of the present invention. A magnetic head slider 1 has a substantially hexahedronal shape, and one surface of the six outer surfaces is an air bearing surface S facing a magnetic recording medium 14.

Figure 3:
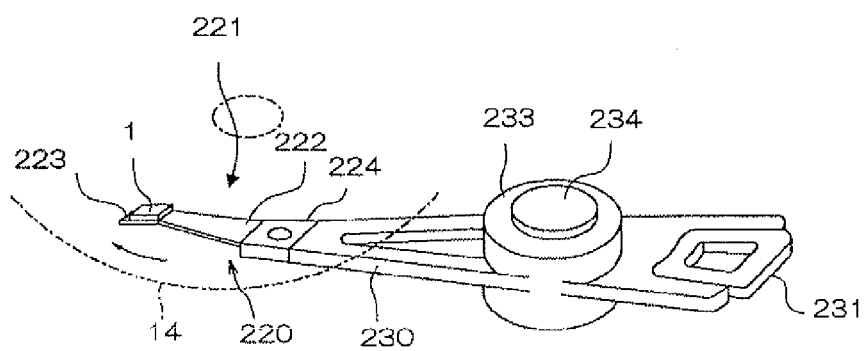
FIG. 3 is a perspective view of a head arm assembly including a head gimbal assembly where the magnetic head of the present invention is incorporated.

FIG. 3 is a perspective view of a head arm assembly including a head gimbal assembly where the magnetic head slider is incorporated. A head gimbal assembly 220 has the magnetic head slider 1 and a suspension 221 elastically supporting the magnetic head slider 1. The suspension 221 has a load beam 222, a flexure 223, and a base plate 224. The load beam 222 is formed in a leaf spring shape and made of stainless steel. The flexure 223 is arranged in one edge part of the load beam 222. The base plate 224 is arranged in the other edge part of the load beam 222. The flexure 223 is joined to the magnetic head slider 1 to give the magnetic head slider 1 suitable flexibility. At the part of the flexure 223 to which the magnetic head slider 1 is attached, a gimbal part is disposed to maintain the magnetic head slider 1 in an appropriate position and orientation.

The magnetic head slider 1 is arranged in the hard disk device such that the magnetic head slider 1 faces the magnetic recording medium (hard disk) 14. The magnetic recording medium (hard disk) 14 has a disk shape and is rotatably driven. In FIG. 3, the magnetic recording medium (hard disk) 14 is positioned above the magnetic head slider 1. When the magnetic recording medium 14 rotates in the direction of the arrow of FIG. 3, air flow passing between the magnetic recording medium 14 and the magnetic head slider 1 generates a downward lifting force to the magnetic head slider 1. The magnetic head slider 1 flies from the surface of the magnetic recording medium 14 due to the lifting force.

An assembly that the head gimbal assembly 220 is mounted on an arm 230 is referred to as a head arm assembly 221. The arm 230 moves the magnetic head slider 1 in the track crossing direction of the magnetic recording medium 14. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The arm 230 and the voice coil motor for driving the arm 230 configure an actuator.

Figure 4:
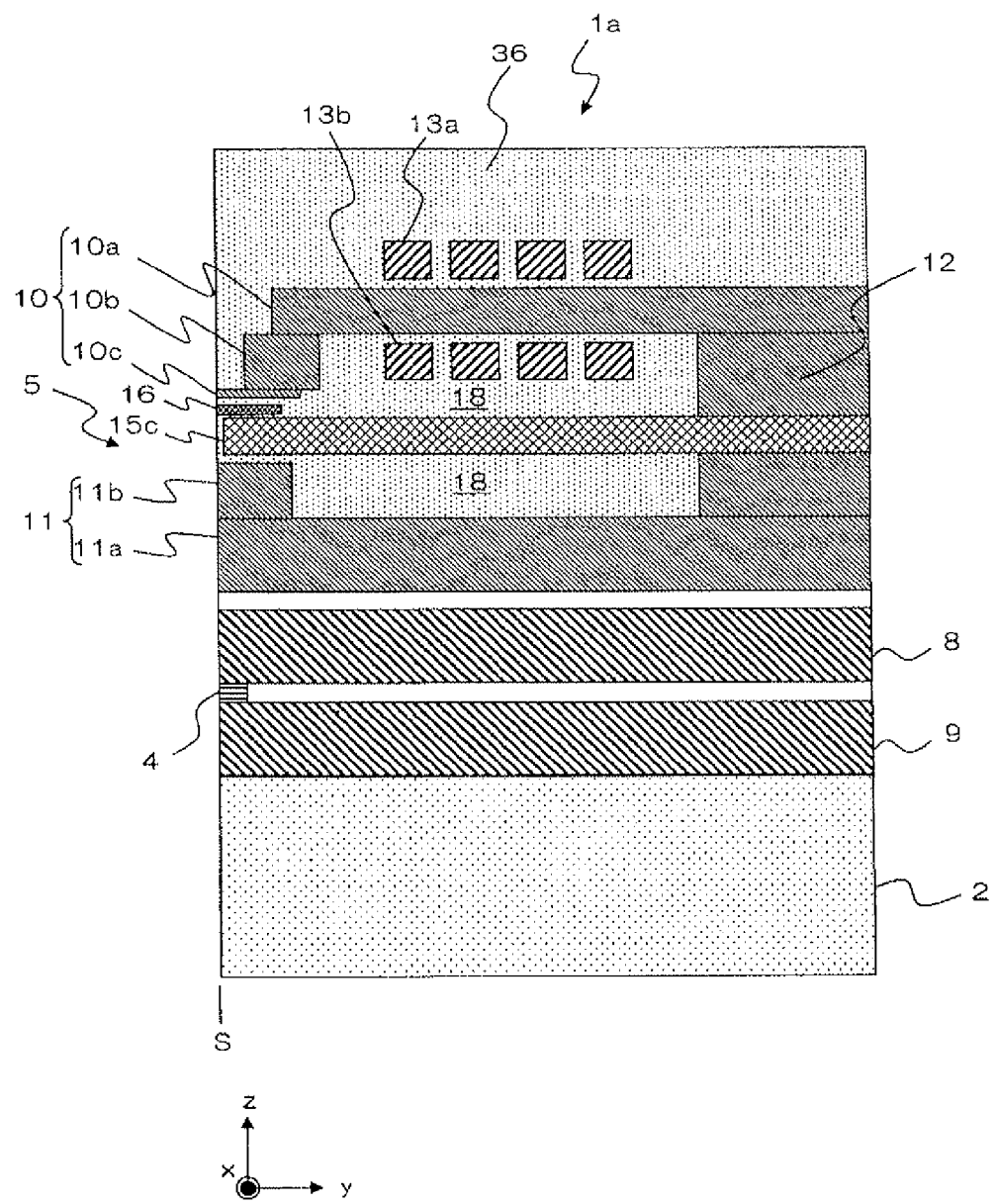
FIG. 4 is a main part cross sectional view of the magnetic head of the present invention.

FIG. 4 is a main part cross sectional view of the magnetic head. A magnetic head 1a has an MR element 4 configuring a reproductive head part and a magnetic recording element 5 configuring a recording head part, which are layered on a substrate 2 made from ALTIC ($Al_2O_3$—TiC). The magnetic head 1a, as described later, has a laser diode 31 for generating laser light and a near field generator 41 for generating near field light from the laser light exiting from the laser diode 31. The near field generator 41 provides a waveguide 17 that propagates the laser light generated in the laser diode 31 as the propagating light, and a plasmon generator 16 that extends to the air bearing surface S facing one part of the waveguide 17 and that generates the near field light on the air bearing surface S. The waveguide 17 has a core 15 and a cladding layer 18 that surrounds the core 15. Furthermore, in the explanation hereafter, "lamination direction" means a film formation direction in a wafer process, and it matches the z direction in various figures. "Upper side of the lamination direction" means a direction orientated toward an overcoat layer 36 from the substrate 2, and "lower side of the lamination direction" means a direction orientated toward the substrate 2 from the overcoat layer 36.

The magnetic head 1a has the reproductive head part providing the MR element 4 positioned by exposing its tip part to the air bearing surface S, an upper side shield layer 8 and a lower side shield layer 9 disposed so that the MR element 4 is interposed between upper and lower sides in the lamination direction. Any configuration using a magneto resistive effect, such as a current-in-plane (CIP)—gigantic-magneto-resistive (GMR) element where a sense current flows in the direction in parallel to the film surface, a current-perpendicular-to-plane (CPP)—gigantic-magneto-resistive (GMR) element where a sense current flows in the direction perpendicular to the film surface (lamination direction) or a tunneling-magneto-resistive (TMR) element utilizing a tunnel effect, can be applied to the MR element 4. When the CPP-GMR element and the TMR element are applied, the upper side shield layer 8 and the lower side shield layer 9 are also utilized as electrodes to supply a sense current.

The magnetic head 1a provides the magnetic recording element 5 for so-called perpendicular magnetic recording that configures the recording head part. The magnetic recording element 5 has a main pole 10 for recording. The main pole is adjacently disposed to a plasmon generator 16, which will be described below. The main pole 10 has a first body part 10a, a second body part 10b and a magnetic pole tip part 10c, all of which are made of an alloy of any two or three of Ni, Fe and Co. The magnetic pole tip part 10c that is an end part of the main pole 10 is positioned on the air bearing surface S. A return shield layer 11 is disposed in the lower side of the main pole 10 in the lamination direction. The return shield layer 11 has a first body part 11a and a second body part 11b, both of which are also made of an alloy of any two or three of Ni, Fe and Co. The main pole 10 and the return shield layer 11 are magnetically linked with each other via a contact part 12. In the present embodiment, the return shield layer 11 is disposed in the lower side of the main pole 10 in the lamination direction, but it can be disposed in the upper side of the main pole 10 in the lamination direction. The overcoat layer 36 made of $Al_2O_3$ is disposed in the upper side of the main pole 10 in the lamination direction.

Coils 13a and 13b are wound around the main pole 10 centering on the contact part 12. A magnetic flux is generated to the main pole 10 by a current applied to the coils 13a and 13b from the outside. The coils 13a and 13b are formed of a conductive material, such as Cu, etc. Two layers of the coils 13a and 13b are established in the present embodiment, but one layer or three layers or more are also acceptable. Further, the number of windings is four in the present embodiment, but are not limited to this.

Figure 5:
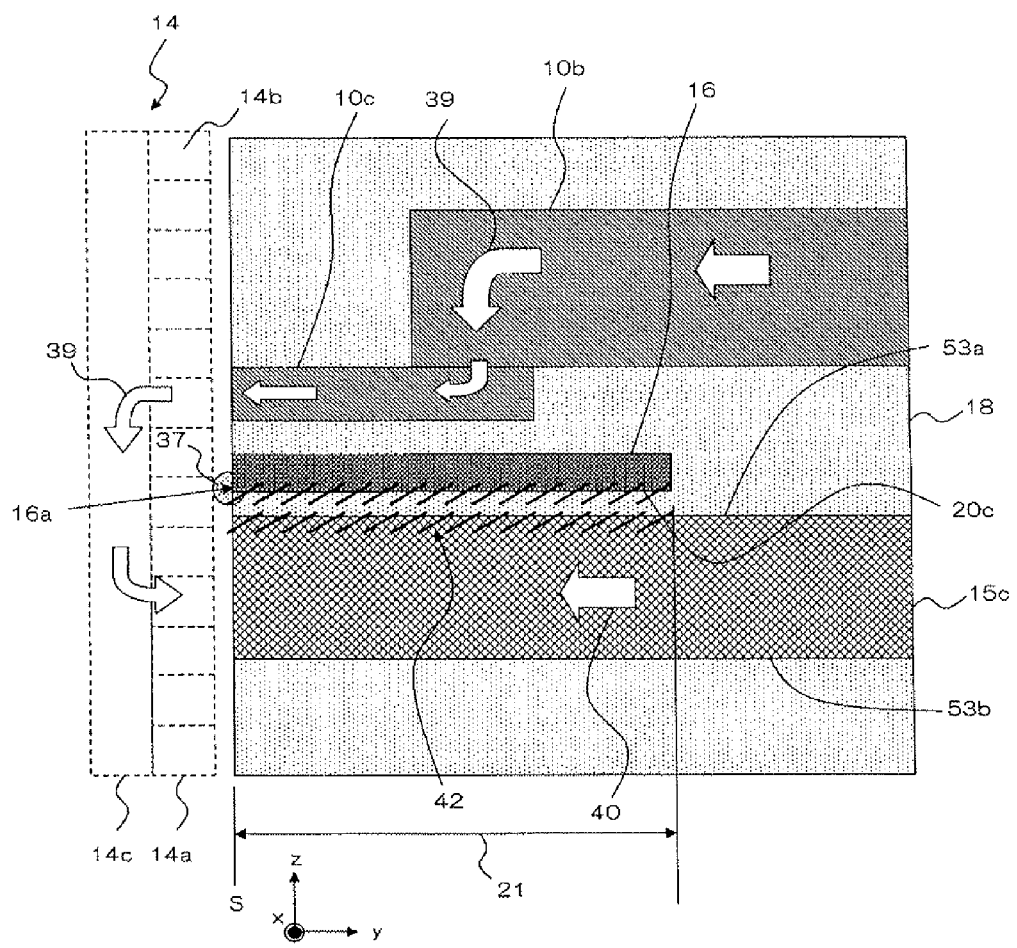
FIG. 5 is an enlarged view of the vicinity of the magnetic recording element of the magnetic head illustrated in FIG. 4.

The main pole 10 is tapered at the magnetic pole tip part 10c in the vicinity of the air bearing surface S not only in the film surface orthogonal direction (z-direction) but also in the track width direction (x-direction). Referring to FIG. 5, the magnetic flux 39 generated within the main pole 10 is tapered as it travels to the air bearing surface S, and is discharged as a minute and strong magnetic flux 39 for writing corresponding to the high recording density toward a magnetic recording medium 14 and from the magnetic pole tip part 10c positioned on the air bearing surface S. The magnetic recording medium 14 has a configuration for perpendicular magnetic recording. The surface layer of the magnetic recording medium 14 is a recording layer 14a, and the magnetic flux 39 discharged from the magnetic pole tip part 10c travels in the recording layer 14a in the perpendicular direction (y-direction), and magnetizes each recording bit 14h of the recording layer 14a in the perpendicular direction. The magnetic flux 39 passes through the recording layer 14a, and then its flux path changes to the in-plane direction (z-direction) of the magnetic recording medium 14 at an under layer 14c made from a soft magnetic body underneath, and further changes direction to the perpendicular direction (y-direction) again in the vicinity of the return shield layer 11 and is absorbed by the return shield layer 11. In other words, the return shield layer 11 plays a role to control the magnetic flux 39 so as to have the magnetic flux perpendicularly pass through the recording layer 14a and create the U-shaped magnetic flux path.

Further, the second body part 11b of the return shield layer 11 forms a trailing shield part whose layer cross section is wider in the track width direction (x-direction) than the first body part 11a. The placement of the return shield layer 11 causes a steep gradient in the magnetic field between the return shield layer 11 and the main pole 10 in the vicinity of the air bearing surface S. As a result, signal output jitter is reduced and an error rate at the time of reading is decreased.

Figure 8:
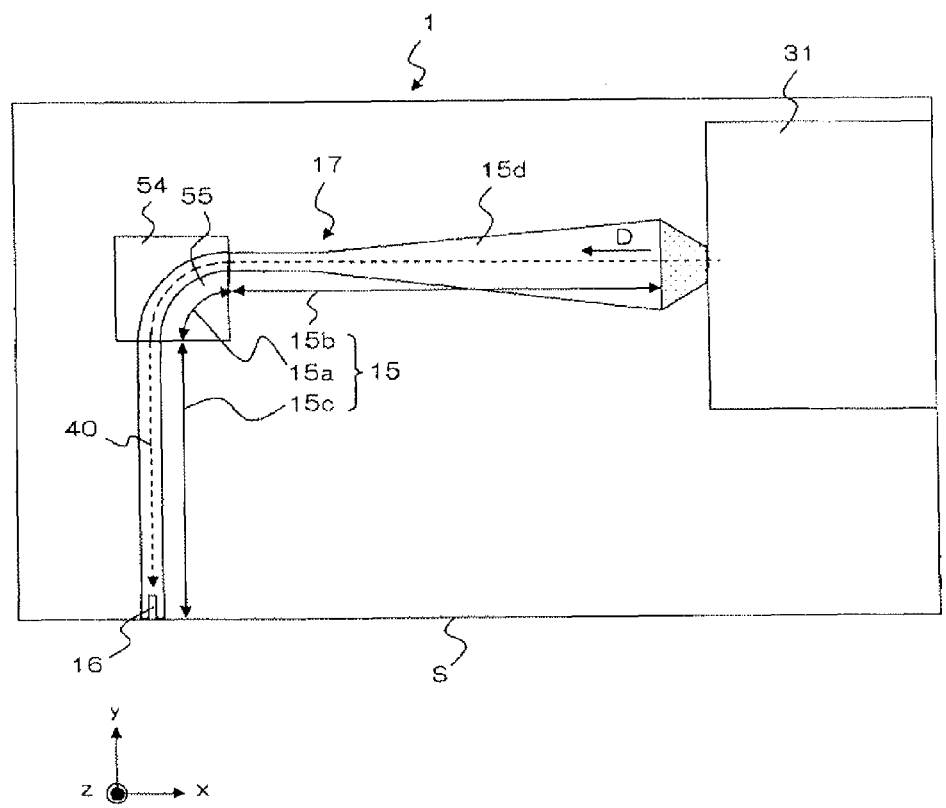
FIG. 8 is a conceptual plan view of the near field generator and the laser diode, illustrated in FIG. 6.

The near field generator 41 provides the waveguide 17 where the laser light entering from the laser diode 31 propagates as the propagating light. FIG. 6 illustrates an entire perspective view of the near field generator and the laser diode. FIG. 7 is a partially enlarged view of the curved part of the waveguide illustrated in A part of FIG. 6. FIG. 7A is a cross sectional view of an entrance part of the curved part cut along line 7A-7A of FIG. 7. FIG. 8 is an entire plan view of the near field generator and the laser diode. The waveguide 17 includes the core 15, which is configured with a curved part 15a that is curved in one direction, and first and second straight parts 15b and 15c that are connected to the curved part 15a at both edge parts of the curved part 15a. The waveguide 17 also includes the cladding layer 18 surrounding the periphery of the core 15 except for a part of the curved part 15a. The core 15 has a higher reflective index than the cladding layer 18, and laser light entering from the laser diode 31 propagates as propagating light 40 toward the air bearing surface S as being totally reflected on the interface between the core 15 and the cladding layer 18.

When the wavelength of the laser light is 600 nm, the cladding layer 18 can be formed, for example, of $SiO_2$ and the core 15 can be formed, for example, of $Al_2O_3$. When the cladding layer 18 is formed of $Al_2O_3$, the core 15 is formed, for example, of tantalum oxide (TaOx). When the wavelength of the laser light is 800 nm, the cladding layer 18 can be formed, for example, of $Al_2O_3$ and the core 15 can be formed, for example, of TaOx. TaOx means titanium oxide with any composition herein, with its typical compositions being $Ta_2O_5$, TaO, $TaO_2$ and or the like, but is not limited to these typical ones.

As illustrated in one example in FIG. 7A, cross sections of the core 15 that are orthogonal to the propagating direction of the propagating light are rectangular in all positions of the curved part 15a and the first and second straight parts 15b and 15c. In the following explanation, "thickness" of the core 15 indicates a size in the z-direction, and "width" of the core 15 indicates a size in a direction orthogonal to "thickness" when seen in the cross section that is orthogonal to a propagating direction D of the propagating light. Note that, in the curved part 15a of the core 15, the direction of the cross section gradually changes in the propagating direction D of the propagating light. In the core 15, the width is larger than the thickness.

The outer surfaces of the core 15 along the propagating direction of the propagating light are defined by four surfaces. Referring to FIGS. 7 and 7A, in the curved part 15a, these four surfaces are configured with first and second planar surfaces 51a and 51b, an inside curved surface (the third surface) 51c, and an outside curved surface (the fourth surface) 51d. The first and second planar surfaces 51a and 51b are respectively curved in a planar surface that is parallel to x-y surface along the propagating direction of the propagating light, and are shaped to almost correspond to a quarter of a circular ring. Curvature radii of the first and second planar surfaces 51a and 51b are constant not depending on their positions, and central points of the circular rings including the first and second planar surfaces 51a and 51b are in the same position in a plan view. The first and second planar surfaces 51a and 51b have the same shape, and are positioned facing each other. However, as long as the first and second planar plan surfaces 51a and 51b are gradually curved in one direction, the curvature radii need not necessarily be constant, and the first and second planar surfaces 51a and 51b can be configured in a manner of continuously connecting shapes that have different curvature radii. Moreover, it is desired that the first and second planar surfaces 51a and 51b are configured in the same shape; however minor differences between the shapes are acceptable.

Each of the inside and outside curved surfaces 51c and 51d that are curved surfaces connects both of the first and second planar surfaces 51a and 51b. The inside and outside curved surfaces 51c and 51d are shaped corresponding to a quarter of a side wall of a cylinder in the present embodiment. The inside curved surface 51c and the outside curved surface 51d are orthogonal to the first and second plan surfaces 51a and 51b, and the cross sections along the propagating direction of the propagating light have a rectangular shape.

In the first and second straight parts 15b and 15c, outer surfaces of the core 15 along the propagating direction of the propagating light are respectively defined by the first-fourth planar surfaces 52a-52d and 53a-53d. The first planar surfaces 52a and 53a of the first and second straight parts 15b and 15c continue to the first planar surface 51a of the curved part 15a, the second planar surfaces 52b and 53b continue to the second planar surface 51b of the curved part 15a, the third plan surfaces 52c and 53c continue to the inside curved surface (the third surface) 51c of the curved part 15a, and the fourth planar surfaces 52d and 53d continue to the outside curved surface (the fourth surface) 51d of the curved part 15a.

The first straight part 15b of the core 15 has a cross section narrowing part 15d of which one edge is positioned at the side of the laser diode 31 and the other edge is positioned at the side of the curved part 15a. The cross section of the cross section narrowing part 15d gradually narrows along the propagating direction D of the propagating light. Specifically, the cross section narrowing part 15d has a trapezoidal planar surface shape with a constant thickness and narrowing width.

The first straight part 15b preferably has a spot size converter 35 that tapers a spot diameter of the propagating light. The spot size converter 35 has a triangular prism shape that is formed in an integrated manner with the first straight part 15b and that is formed of the same material as the first straight part 15b. The laser light that exits from the laser diode 31 is introduced to the spot size converter 35 where the spot diameter is narrowed. The propagating light of which the spot diameter is narrowed is introduced to the cross section narrowing part 15d at the tip part 35a of the spot size converter 35 and enters the curved part 15a of the core 15. The spot diameter is narrowed only in the cross section narrowing part 15d; however, an arrangement of the spot size converter 35 enables the spot diameter to be tapered more efficiently.

One edge of the second straight part 15c is connected to the curved part 15a and the other edge extends to the air bearing surface S or to the vicinity thereof. Referring to FIG. 4, the second straight part 15c extends between the main pole 10 and a return shield layer 11. The second straight part 15c ends in the vicinity of the air bearing surface S; however, the second straight part 15c may extend to the air bearing surface S. Not illustrated in the drawings, however, the cladding layer 18 is arranged between the second straight part 15e and a contact part 12.

The propagating light propagates in the core 15 in two types of modes. One is a propagation mode where an oscillation direction of an electric field in a cross section orthogonal to the propagating direction of the propagating light is a thickness direction (z-direction). The other is a propagation mode where the oscillation direction of an electric field of the propagating light is a width direction of the core 15. The plasmon generator 16, which will be described below, extends to the air bearing surface S facing one part of the first surface 53a of the second straight part 15c. A surface plasmon is generated when the plasmon generator 16 is positioned at a position facing the oscillation direction of the electric field of the propagating light. For this, in order to excite the surface plasmon in the plasmon generator 16, it is required that the first planar surfaces 51a, 52a and 53a (accordingly, the second planar surfaces 51b, 52b and 53b as well) of the core 15 are arranged in a direction where the oscillation direction of the electric field of the propagating light is extended. Specifically, as seen in FIG. 7A, it is required that the oscillation direction of the electric field of the propagating light is in Z-direction of the drawing, and that the oscillation direction of the magnetic field is in X-direction of the drawing.

The magnetic head 1a incorporates a laser diode 31 for generating the laser light. The laser diode 31 has a pair of electrodes 32a and 32b, positive (P) type and negative (N) type claddings 33a and 33b interposed by these electrodes, an active layer 34 positioned between the claddings 33a and 33b, and a cleavage surface that has a reflecting mirror structure. The active layer 34 where the laser light is continuously emitted is arranged on the same line as the first straight part 15b of the core 15, and the laser light generated in the active layer 34 is designed to enter the first straight part 15b as propagating light 40. The wavelength of the laser light is not particularly limited, but laser light having a wavelength of approximately 800 nm is preferably used.

The plasmon generator 16 extends to the air bearing surface S as facing a part of the first surface 53a of the second straight part 15c of the core 15. The plasmon generator 16 extends to the air bearing surface S above the second straight part 15c in a substantially parallel manner with the second straight part 15e. The plasmon generator 16 is formed of Au, Ag, Cu, Al, Pd, Ru, Pt, Rh, Ir or of an alloy consisting primarily of these metals. The plasmon generator 16 is a metallic piece having a mostly-triangular prism shape with triangular cross sections. Three apexes of the plasmon generator 16 on the triangular cross section form respectively three edges 20a, 20b and 20c extending along the longitudinal direction (y-direction) of the plasmon generator 16. Thus, the plasmon generator 16 is formed so as to have one apex on the triangular cross section facing the core 15, and this apex forms the propagation edge 20c facing the core 15.

Referring to FIG. 5, the propagation edge 20c has an overlapping part 21 that overlaps with the core 15 in the longitudinal direction (y-direction) of the plasmon generator 16. The overlapping part 21 generates surface plasmon 42 by coupling the propagating light 40 propagating in the core 15 in a surface plasmon mode. An edge of the plasmon generator 16a is formed at the edge of the air bearing surface S of the plasmon generator 16. The edge of plasmon generator 16a is positioned in the vicinity of the magnetic pole tip part 10c on the air bearing surface S. The surface plasmon 42 generated in the overlapping part 21 propagates to the edge of plasmon generator 16a along the propagation edge 20c. Near field light 37 is generated from the edge of the plasmon generator 16a. Then, as described above, when information is recorded, heat and a magnetic field are simultaneously applied to a portion of the magnetic recording medium 14 in which information is recorded. Therefore, the temperature of the portion where information is recorded increases, the coercive force decreases, thereby enabling information to be recorded.

The waveguide 17 has an outside metal cladding 54 that is positioned to cover the outside curved surface 51d along the outside curved surface 51d of the curved part 15a of the core 15. Similarly, the waveguide 17 has an inside metal cladding 55 that is positioned to covering the inside curved surface 51c along the inside curved surface 51e of the curved part 15a of the core 15. The outside and inside metal claddings 54 and 55 are arranged in a direction orthogonal to the oscillation direction of the electric field of the propagating light on the cross section orthogonal to the propagating direction of the propagating light. These outside and inside metal claddings 54 and 55 are made of gold, silver, copper or aluminum, or are primarily composed of one component of these materials. The outside and inside metal claddings 54 and 55 are preferably arranged over overall heights of the outside curved surface 51d and the inside curved surface 51e, i.e., over the entire area of the core 15 in the thickness direction. The outside and inside metal claddings 54 and 55 have a rectangular outer circumference in a portion where the outside and inside metal clads 54 and 55 do not face the curved parts 15a and 15b. However, the outside and inside metal claddings 54 and 55 may be formed in a manner of a uniform film thickness along the outside curved surface 51d and the inside curved surface 51c. Except for a surface facing the core 15, the outside and inside metal claddings 54 and 55 are covered with the cladding layer 18.

These metal claddings 54 and 55 function to enclose the propagating light in the core 15 when the propagating light entering the curved part 15a propagates along the curved part 15a. In a case where the outside and inside metal claddings 54 and 55 are not disposed around the curved part, and where the propagating light enters the curved part 15a that is curved with a curvature scale of several μm, the propagating light tends to penetrate the core 15 and to travel straight. On the other hand, when the outside and inside metal claddings 54 and 55 are disposed, an effect of enclosing the propagating light in the curved core 15 is enhanced. As a result, the propagating light propagates as curving along the curved part 15a, exits from the curved part 15a while maintaining a high energy level, and enters the second straight part 15c. Therefore, the propagating loss of the propagating light at the curved part 15a decreases, and desired light energy can be generated in the plasmon generator 16 with a low output of the laser diode.

Particularly, the outside metal cladding 54 has a large effect of enclosing the propagating light. On the other hand, since the inside metal cladding 55 does not as large an effect of enclosing the propagating light as the outside metal cladding 54, the inside metal cladding 55 may be omitted.

It is preferred that the first and second planar surfaces are not covered by a metal cladding that is made of gold, silver, copper or aluminum, or that is primarily composed of one component of these materials. When the metal cladding exists in the electric field oscillation direction of the propagating light, the propagating light plasmon-couples to the metal clad, and the energy of the propagating light is removed from the curved part 15a. In the present embodiment, as illustrated in FIG. 7, the first and second planar surfaces 51a and 51b are covered by the cladding layer 18 made of $Al_2O_3$.

Figure 9A:
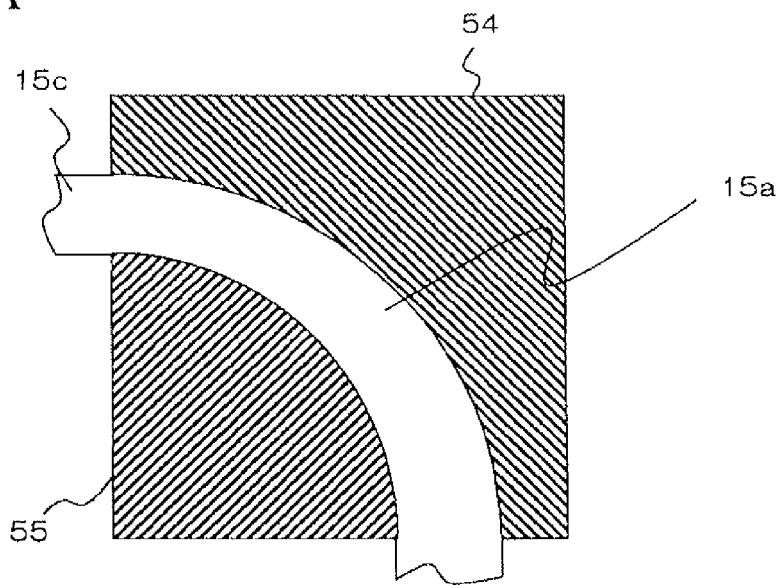
FIGS. 9A and 9B are conceptual plan views of the curved part of the waveguide illustrated in FIG. 6.
Figure 9B:
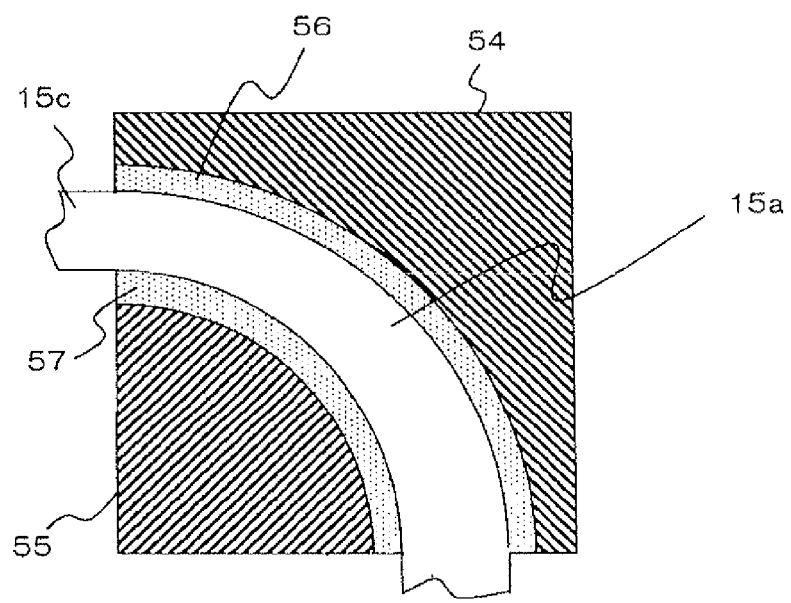

As illustrated in FIG. 9B, intermediate cladding layers 56 and 57 may be arranged between the outside and inside metal claddings 54 and 55 and the outside curved surface 51d of the curved part 15a of the core 15. The intermediate cladding layers 56 and 57 can be formed of the same material as that of the cladding layer 18. Disposing the intermediate cladding layers 56 and 57 as such provides an advantage for the manufacturing process. The reasons are as the follows. In order to form the outside and inside metal claddings 54 and 55, at first, the core 15 and the cladding layer 18 are formed. Then, a part of the cladding layer 18 is removed by milling, and the outside and inside metal claddings 54 and 55 are formed therein. At that time, if the milling is executed to expose the core 15, there is a possibility that a part of the core 15 is removed by the milling. Therefore, it is preferred to execute the milling such that a small part of the cladding layer 18 is left on the surface of the core 15. As a result, the cladding layer 18 that was not removed remains as the intermediate cladding layers 56 and 57 between the core 15 and the outside and inside metal claddings 54 and 55. Namely, disposing the intermediate cladding layers 56 and 57 (remaining the cladding layer 18) enhances the flexibility of the milling. However, with respect to the effect of enclosing the light, it is preferred that the metal cladding directly contacts the core 15 without the intermediate cladding layers 56 and 57. The film thicknesses of the intermediate cladding layers 56 and 57 are preferred to be set at 500 nm or less.

The curvature radius of the core 15 is arbitrarily optimized based on a size of the magnetic head slider, the required propagating efficiency, etc. However, generally, the curvature radius is preferred to be 1 μm or more and 10 μm or less at the outer circumference part. If the curvature radius becomes too small, the propagating efficiency will decrease. Therefore, it is preferred that the lower value of the curvature radius is approximately 1 μm. On the other hand, when the curvature radius becomes larger, the propagating efficiency will adversely decrease. Although the reason is not clarified, it is considered that the outside and inside metal claddings 54 and 55 on both sides of the curved part 15a make it easier to absorb the propagating light. It is preferred that the upper value is approximately 10 μm.

Figure 10A:
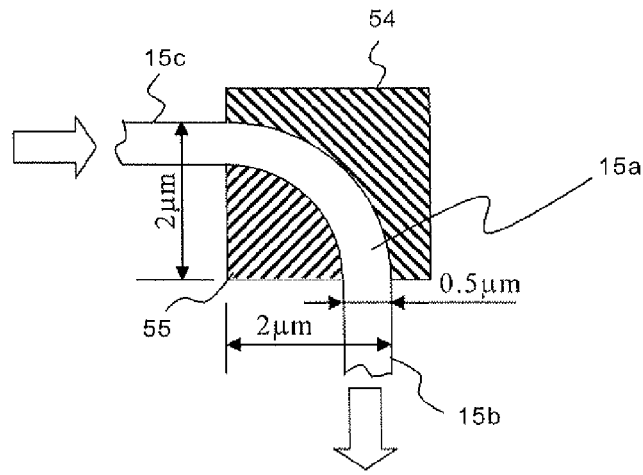
FIGS. 10A-10C are conceptual plan views illustrating examples and comparative examples of the curved part of the waveguide.
Figure 10B:
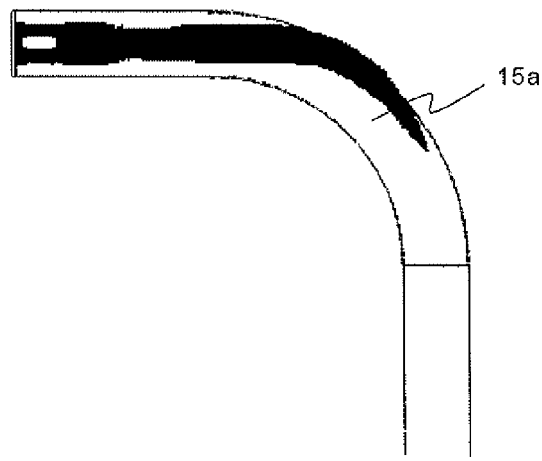
Figure 10C:
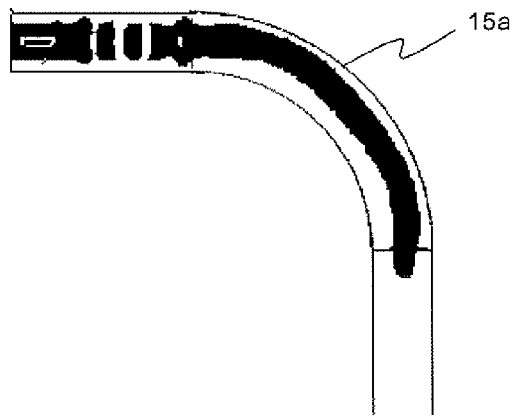

Next, the effect of enclosing the light of the waveguide 17 was confirmed by simulations. FIG. 10A illustrates a plan view of the curved part 15a of the core 15 used for the calculation. The core 15 was made of tantalum oxide, the cross sectional size was set with the width 0.05 μm× the thickness 0.04 μm, and the curvature radius of the outer circumference was set at 2 p.m. The propagating light having the wave length of 800 nm entered from the entrance part of upper let of the drawing and exited from the exit part at the lower right of the drawing. FIG. 10B illustrates a comparative example of which the entire outer circumference of the core 15 was covered by the cladding layer made of $Al_2O_3$. FIG. 10C illustrates an embodiment of which the metal claddings 54 and 55 made of gold are disposed at the outer circumference side and the inner circumference side of the core 15 and the other parts are covered with the cladding layer made of $Al_2O_3$. The core 15 and the metal claddings 54 and 55 were disposed in a directly contacting manner and the intermediate cladding layer was not disposed between them.

In FIGS. 10B and 10C, the part of the core 15 that appears black illustrates an area where energy of the propagating light is high. Referring to FIG. 10B, the propagating light that entered the curved part 15a from the upper left entrance part lost a large quantity of the energy around where the propagating light passed a half of the curved part 15a. However, referring to FIG. 10C, the loss of the energy in the curved part 15a was small. The propagating efficiency (a ratio between the energy of the propagating light at the entrance part and the energy of the propagating light at the exit part) was 49.2% in FIG. 10B and was 64.1% in FIG. 10C.

When the width of the core of the curved part is a little wider than the width of the straight part, the propagating efficiency is improved. For example, in the example of FIG. 10C, where the width of the curved part was widened approximately 20% and was set to 0.6 μm, the propagating efficiency was 76.5%, which was an improvement of approximately 20%. It is considered that a slightly wider width of the curved part improves the effect for enclosing the propagating light by the metal clad.

Next, the effect of the propagating efficiency of the curvature radius was examined as varying the curvature radius. Propagating efficiencies were obtained for two cases in which the curvature radii of the outer circumference part were 1 μm or 3 μm using the example of which the width of the curved part was increased approximately 20% and was set to 0.6 μm. As a result, a propagating efficiency of 65.8% was obtained for the case of 1 μm (76.5% in the case of 2 μm as described above), and a propagating efficiency of 80.9% was obtained for the case of 3 μm. As described above, even though the curvature radius is approximately 1 μm, it is possible to practically apply. Also, it was confirmed that the propagating efficiency improves as the curvature radius increases (however, if the curvature radius is too large, as described above, the propagating efficiency contrarily decreases). Moreover, when the metal claddings made of gold are disposed only in the outer circumference part and the cladding layer made of $Al_2O_3$ is disposed in the inner circumference part, a degree of propagating efficiency similar to where the metal cladding is disposed in the inter circumference part was obtained.

Figure 11:
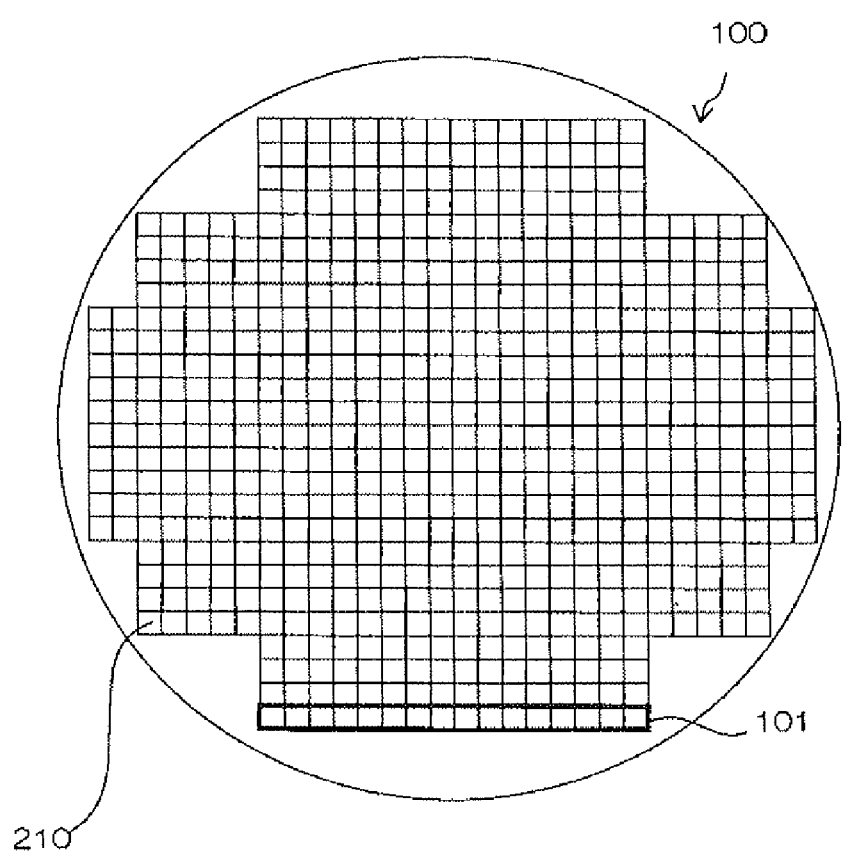
FIG. 11 is a plan view of a wafer in relation to a manufacture of the magnetic head of the present invention.

Next, a wafer to be used for manufacturing the magnetic head, which was described above, is explained. Referring to FIG. 11, at least a stack 210 forming the magnetic head 1a is formed on a wafer 100. The wafer 100 is divided into a plurality of row bars 101. The row bar 101 is a working unit during the lapping process of the air bearing surface S.

Figure 12:
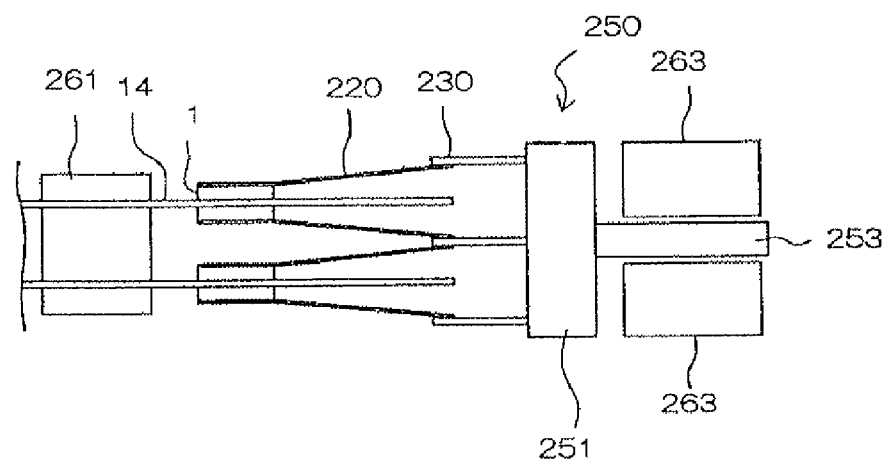
FIG. 12 is a side view of the head arm assembly where the magnetic head of the present invention is incorporated.
Figure 13:
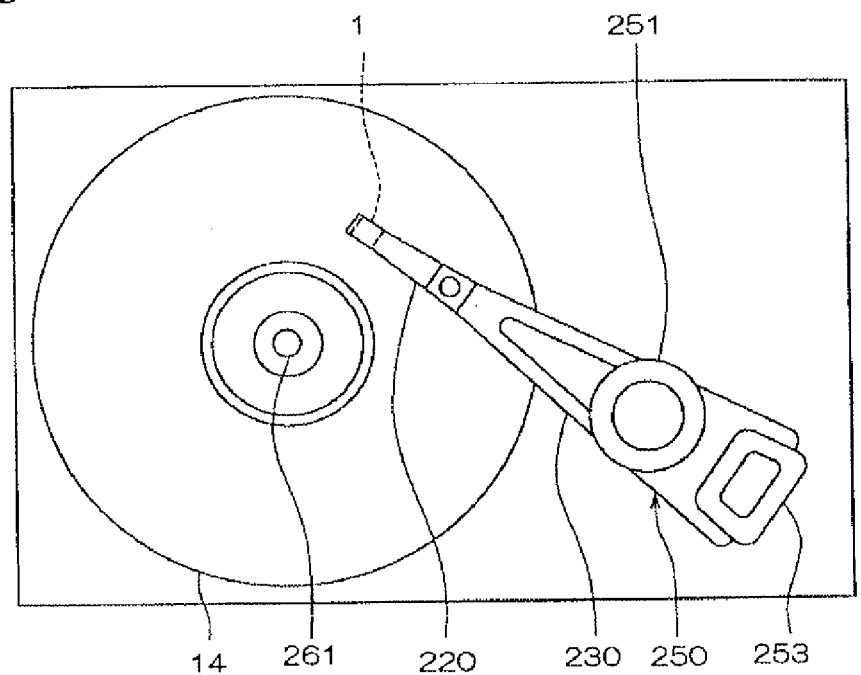
FIG. 13 is a plan view of the hard disk device where the magnetic head of the present invention is incorporated.

Next, referring to FIG. 12 and FIG. 13, a head stack assembly where the magnetic head slider 1 providing the above-described magnetic head is incorporated and the hard disk device are explained. The head stack assembly is a member where the head gimbal assembly 220 is mounted to each arm of a carriage having a plurality of arms. FIG. 12 is a side view of the head stack assembly, and FIG. 13 is a plan view of the hard disk device. The head stack assembly 250 has a carriage 251 having a plurality of arms 230. The head gimbal assemblies 220 are mounted to the arms 230 so as to align in the perpendicular direction at intervals from each other. A coil 253, which becomes a part of the voice coil motor 13, is mounted to the carriage 251 at the opposite side of the arm 230. The voice coil motor has permanent magnets 263 arranged at the positions facing across the coil 253.

Referring to FIG. 12, the head stack assembly 250 is incorporated into the hard disk device. The hard disk device has a plurality of magnetic recording media 14 mounted to a spindle motor 261. Two magnetic head sliders 1 are arranged in the magnetic recording media 14, respectively, so as to face across the magnetic recording media 14. The actuator and the head stack assembly 250 excluding the slider 1 support the magnetic head sliders 1 and concurrently, position the magnetic head sliders 1 with respect to the magnetic recording media 14. The magnetic head sliders 1 are moved to the track transverse direction of the magnetic recording media 14 by the actuator, and are positioned with respect to the magnetic recording media 14. The magnetic head sliders 1 record information on the magnetic recording medium 14 by a recording head, and reproduce the information recorded on the magnetic recording medium 14 by a reproducing head.

The desirable embodiments of the present invention were presented and explained in detail. However, it should be understood that the present invention is variously modifiable and correctable without departing from the purpose of the attached claims or the scope of the invention.

What is claimed is:

1. A curved waveguide that propagates laser light entering from the laser diode as propagating light, comprising:
    a core that is curved in one direction where the propagating light can be propagated and that includes outer surfaces along a propagating direction of the propagating light defined by four surfaces including first and second planar surfaces that curve in respective planar surfaces and that are positioned to face each other, and inside and outside curved surfaces that connect the first and second planar surfaces;
    an outside metal cladding that is positioned in a direction orthogonal to an oscillation direction of an electric field of the propagating light in a cross section orthogonal to the propagating direction of the propagating light and only along the outside curved surface of the core, that is made of gold, silver, copper or aluminum, or that is primarily composed of one component of these materials; and
    a cladding layer that covers the first and second planar surfaces and the outside metal cladding.

2. The waveguide according to claim 1, further comprising an intermediate cladding layer that is positioned between the outside metal cladding and the core.

3. The waveguide according to claim 1, further comprising an inside metal cladding that is positioned along the inside curved surface of the core covering the inside curved surface, and that is made of gold, silver, copper or aluminum, or that is primarily composed of one component of these materials.

4. The waveguide according to claim 1, wherein a curvature radius of an outer circumference part of the core is 1 μm or more and 10 μm or less.

5. The waveguide according to claim 1, wherein the cladding layer directly covers the first and second planar surfaces and the outside metal cladding.

6. A magnetic head comprising:
a laser diode that generates laser light;
a near field generator generating near field light and including a waveguide that propagates the laser light entering from the laser diode as propagating light, and a plasmon generator that extends to an air bearing surface as facing a part of the waveguide and that generates the near field light on the air bearing surface;
a main pole for recording that is disposed adjacent to the plasmon generator, and including an edge that is positioned on the air bearing surface; wherein
the waveguide includes;
 a core through which the propagating light propagates, the core including,
  a curved part that is curved in one direction,
  a first straight part that provides a cross section narrowing part gradually narrowing in cross section along the propagating direction of the propagating light, and that includes one edge connected to the curved part and another edge connected to the laser diode,
  a second straight part including one edge connected to the curved part and another edge extending to the air bearing surface or to the vicinity of the air bearing surface, wherein
  outer surfaces of the core along a propagating direction of the propagating light are defined by first and second planar surfaces that curve in respective planar surfaces and that are positioned to face each other, and third and fourth surfaces that connect the first and second planar surfaces to each other, the third and fourth surfaces forming inside and outside curved surfaces in the curved part, and
 an outside metal cladding that is positioned in a direction orthogonal to an oscillation direction of an electric field of the propagating light in a cross section orthogonal to the propagating direction of the propagating light and only along the outside curved surface of the core, and that is made of gold, silver, copper or aluminum, or that is primarily composed of one component of these materials; and
 a cladding layer that covers the first and second planar surfaces and the outside metal cladding, wherein
the plasmon generator extends to the air bearing surface as facing a part of the first or second planar surface of the second straight part, and has a propagation edge extending in a longitudinal direction,
the propagation edge provides an overlapping part that overlaps the second straight part in the longitudinal direction and a plasmon generator edge part that is positioned on an air bearing surface and in the vicinity of the main pole and that generates the near field light,
the overlapping part of the propagation edge generates surface plasmon by coupling the propagating light propagating in the second straight part in a surface plasmon mode, and
the propagation edge propagates the surface plasmon generated in the overlapping part to the plasmon generator edge part.

7. The magnetic head according to claim 6, further comprising an intermediate cladding layer positioned between the outside metal cladding and the outside curved surface in the curved part of the core.

8. The magnetic head according to claim 6, further comprising an inside metal cladding that is positioned along the inside curved surface of the core covering the inside curved surface, and that is made of gold, silver, copper or aluminum, or that is primarily composed of one component of these materials.

9. The magnetic head according to claim 6, wherein a curvature radius of an outer circumference part of the core is 1 μm or more and 10 μm or less.

10. The magnetic head according to claim 6, wherein the first straight part of the core has a spot size convertor.

11. The magnetic head according to claim 6, wherein a width of the curved part of the core is wider than widths of the first and second straight parts.

12. A wafer on which the magnetic head according to claim 6 is formed.

13. A head gimbal assembly that has a magnetic head slider providing the magnetic head according to claim 6, and a suspension elastically supporting the magnetic head slider.

14. A hard disk device that has a magnetic head slider providing the magnetic head according to claim 6, and a device supporting the magnetic head slider and positioning the magnetic head slider with respect to a magnetic recording medium.

15. The waveguide according to claim 6, wherein the cladding layer directly covers the first and second planar surfaces and the outside metal cladding.

* * * * *